United States Patent [19]

Brixner et al.

[11] 4,349,249
[45] Sep. 14, 1982

[54] COMPOUND LENS

[75] Inventors: Berlyn B. Brixner; Morris M. Klein; Max A. Winkler, all of Los Alamos, N. Mex.

[73] Assignee: The United States of America as represented by the United States Department of Energy, Washington, D.C.

[21] Appl. No.: 151,995

[22] Filed: May 21, 1980

[51] Int. Cl.³ .............................. G02B 1/02; G02B 9/22
[52] U.S. Cl. ...................................... 350/483; 350/464; 350/476
[58] Field of Search ........................ 350/483, 476, 464

[56] References Cited

U.S. PATENT DOCUMENTS

| 2,363,770 | 11/1944 | Bennett | 350/472 |
| 2,455,808 | 12/1948 | Reiss | 350/470 |
| 2,487,873 | 11/1949 | Herzberger et al. | 350/475 |

OTHER PUBLICATIONS

Nefedov, "The Design of Apochromats Made from Two or Three Different Glasses", Optical Technology, vol. 40, No. 1, 1/73-pp. 46-57.
Brixner, "Faster LASL Lens Design Program", LA-UR-73-286; Applied Optics, vol. 12, No. 11, 11/73-pp. 2703-2708.
Baker, "Planetary Telescopes", Applied Optics, vol. 2, No. 2, 2/63-pp. 111-129.

Primary Examiner—John K. Corbin
Assistant Examiner—Rebecca D. Gass
Attorney, Agent, or Firm—Robert W. Weig; Paul D. Gaetjens; Richard G. Besha

[57] ABSTRACT

The disclosure relates to at least one calcium fluoride optical element used in combination with at least two ordinary crown glass lens elements to greatly reduce secondary spectrum in optical systems.

9 Claims, 2 Drawing Figures

COMPOUND LENS

This invention is a result of a contract with the Department of Energy, Contract No. W-7405-ENG-36.

BACKGROUND OF THE INVENTION

The invention relates to compound lenses and more particularly to compound lenses incorporating ordinary crown glass and calcium fluoride elements providing improved optical characteristics.

For many years an urgent problem in lens design has been needed correction of secondary spectrum in large optical systems of moderate aperture and field in which all other aberrations can be virtually eliminated, as noted by J. G. Baker, Appl. Opt. 2, 111-129 (1963). Many patents show the use of calcium fluoride ($CaF_2$) crystal in conjunction with various glasses to solve the problem. For example, U.S. Pat. No. 2,455,808 to Reiss shows a well known lens type (the Double Gauss) in combination with $CaF_2$ in two elements and glass of refractive index less than 1.57 for the remaining elements. The extent to which this solution satisfies the goal is not specified. The glasses used are all outside the ranges of those of the instant invention.

U.S. Pat. No. 2,487,873 to Hertzberger et al. discloses a triplet design with some performance results given in the table in Col. 4, line 50. The paraxial secondary spectrum for the C-F range calculates to be 1 part in 5300 and spherochromatism at f/7.1 calculates as 1 part in 5500. The lens of this patent would not be good for more than a 2° field because it does not produce good correction of other aberrations. The allegation of "almost perfect correction of secondary spectrum" (Col. 4, line 34) does not seem to be borne out by the numbers in the table. In any case, the glass used, 620604, is far outside the glass index range of the instant invention. Example (3) uses glass 541599, which is at the edge of the range of the instant invention but not in the best region. (Col. 5, line 73).

The evaluation of secondary spectrum by paraxial ray tracing is the classical procedure because the calculations are well suited for the pencil and paper methods used a century ago. When mechanical calculators became commercially available (1930), the more tedious spherochromatism calculations for the whole lens aperture came into use because it gave a better evaluation of lens performance. When electronic computers became commercially available (1950), the positions of the best image spots throughout the field gave an even better evaluation of secondary chromatic errors, along with a better evaluation of all aberrations. The LASL lens design code disclosed in LA-UR-73-286 uses the image-spot size and position data to evaluate lens performance.

SUMMARY OF THE INVENTION

One object of the invention is to provide improved diffraction limited performance.

Another object of the invention is to provide improved imaging characteristics in the photographic and the visual or C-F range of the spectrum.

One advantage of the instant invention is that the parts thereof comprise inexpensive ordinary crown glass elements.

In accordance with the present invention there is provided a compound lens comprising at least one optical element of calcium fluoride and at least two optical elements of ordinary crown glass. The crown glass has an index of refraction with sodium light between about 1.500 and about 1.540, preferably between about 1.515 and about 1.525, and an Abbe number between about 56.5 and about 61.0, preferably between about 58.5 and about 60.5. The secondary spectrum of the lens is less than about 1 part in 50,000 in the C-F range. The field of view of the lens is usually less than about 11° and is preferably less than about 7° for best results. The invention provides excellent results at from at least about F/5 to about F/64. In practicing the invention, ordinary crown glass may be selected from the group consisting of 518590, 522595, and 518603.

The accompanying drawings, which are incorporated in and form a part of the specification illustrate exemplary embodiments of the present invention and, together with the description, serve to explain the principles of the invention. In the drawings:

DETAILED DESCRIPTION OF THE INVENTION

Figure 1:
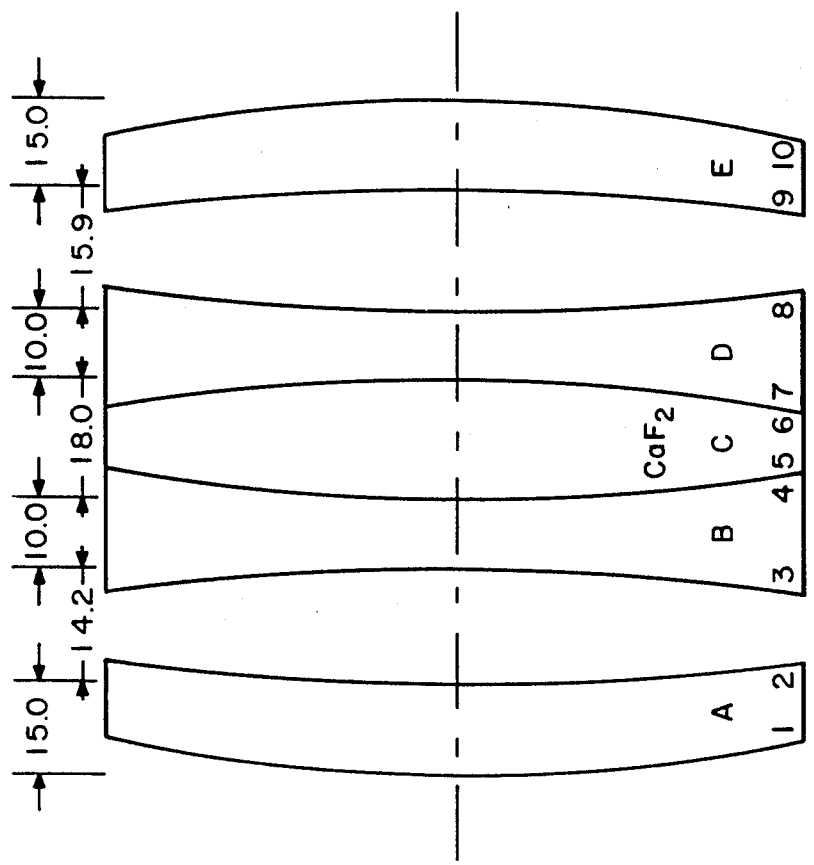
FIG. 1 shows an exemplary compound lens in accordance with the invention.

In practicing the invention, at least one element of optical grade calcium fluoride is utilized in combination with at least two elements of ordinary crown glass such as 518590, 522595, and 518603. All of the ordinary crown glass elements may be of one type, such as 518590, or each element may comprise any of the appropriate types of ordinary crown glass such as a 518590 element in combination with a 522595 element, two 518590 elements with a 518603 element and so on. It is not critical whether elements of the same or different types of ordinary crown glass are combined or in what combination they are combined. However, any ordinary crown glass utilized must have an index of refraction with sodium light between about 1.500 and about 1.540 and preferably between about 1.515 and 1.525; its Abbe number should lie between about 56.5 and about 61.0, preferably between about 58.5 and 60.5. Glass specifications are critical because glasses within the above ranges have the ability, when used with calcium fluoride, to reduce the secondary spectrum and the spherochromatism to very small values and at the same time to make possible the excellent correction of all of the other lens aberrations. That a calcium-fluoride element reduces the residual color errors of a lens system was discovered more than a century ago, but the best possible selection of glass types was not explored because at that state of the art the need to reduce the secondary spectrum did not require the ultimate that the technique was capable of giving. Calcium fluoride is used in microscope objectives, but the invention's use of it is different because the lenses in accordance with the invention have 100 times the focal length of microscope objectives and therefor require large high-quality lens elements comprising material which has only become available in recent years. The parameters for glass selection of the invention would probably benefit microscope objectives such as shown in U.S. Pat. No. 2,363,770, to Bennett, the last table of which uses glasses having an index of refraction from 1.54 to 1.58 along with calcium fluoride. Large aperture lenses especially will benefit from reduced secondary spectrum. A novel feature of the invention is that near perfect optical performance can be obtained when one or more calcium fluoride elements are used in combination with two or more elements of ordinary crown glass such as 518590, 522595, and 518603, having the above-noted characteristics. If glass outside the above-noted index refraction and dispersion ranges is used, optical performance of the lens deteriorates because (1) the correction of the secondary spectrum is not as good as in the above-noted ranges and (2) correction of the other aberrations going into making a good lens is not as good. The greater the departure from the stated index of refraction and dispersion ranges, the greater the performance deterioration.

Because a calcium fluoride element does not take a good polish it is preferably enclosed between glass elements and cemented thereto to minimize the effect of any polish defects. The ordinary crown glass elements may be in the form of positive or negative elements, depending on the position of the lens element in the system.

The F/numbers of the lens is not believed to be critical in practicing the invention. However, it is expected the invention will be most useful in lenses of F/5 to F/64. The examples illustrate lenses of F/6 and F/18. Naturally, the wider the field of view the more difficult it is to maintain optimum lens characteristics in any lens. Therefore, best results are reached if the field of view is less than about 7° although fields of view of 10° and 12° provide adequate optical characteristics in many applications.

Reference is now made to FIG. 1 which shows an exemplary lens in accordance with the present invention. The lens is 1800 mm F.L. at F/18. Its description is given in Table I which follows.

TABLE I

| Surface | Radius + For Convex Radius − For Concave | Axial Thickness | Optical Glass | Lens Element |
|---|---|---|---|---|
| 1 | +244.2 | 15.0 | 518590 | A |
| 2 | −713.0 | | Melt 353177 | |
| 3 | −1024.5 | 10.0 | 518590 | B |
| 4 | −355.6 | | Melt 353177 | |
| 5 | +355.6 | 18.0 | Calcium Flouride | C |
| 6 | +927.2 | | | |
| 7 | −927.2 | 10.0 | 518590 | D |
| 8 | −322.5 | | Melt 353177 | |
| 9 | +1545.5 | 15.0 | 518590 | E |
| 10 | +439.4 | | Melt 353177 | |

The performance of the FIG. 1 lens has been found to be diffraction limited, and it therefore gives excellent optical performance.

Figure 2:
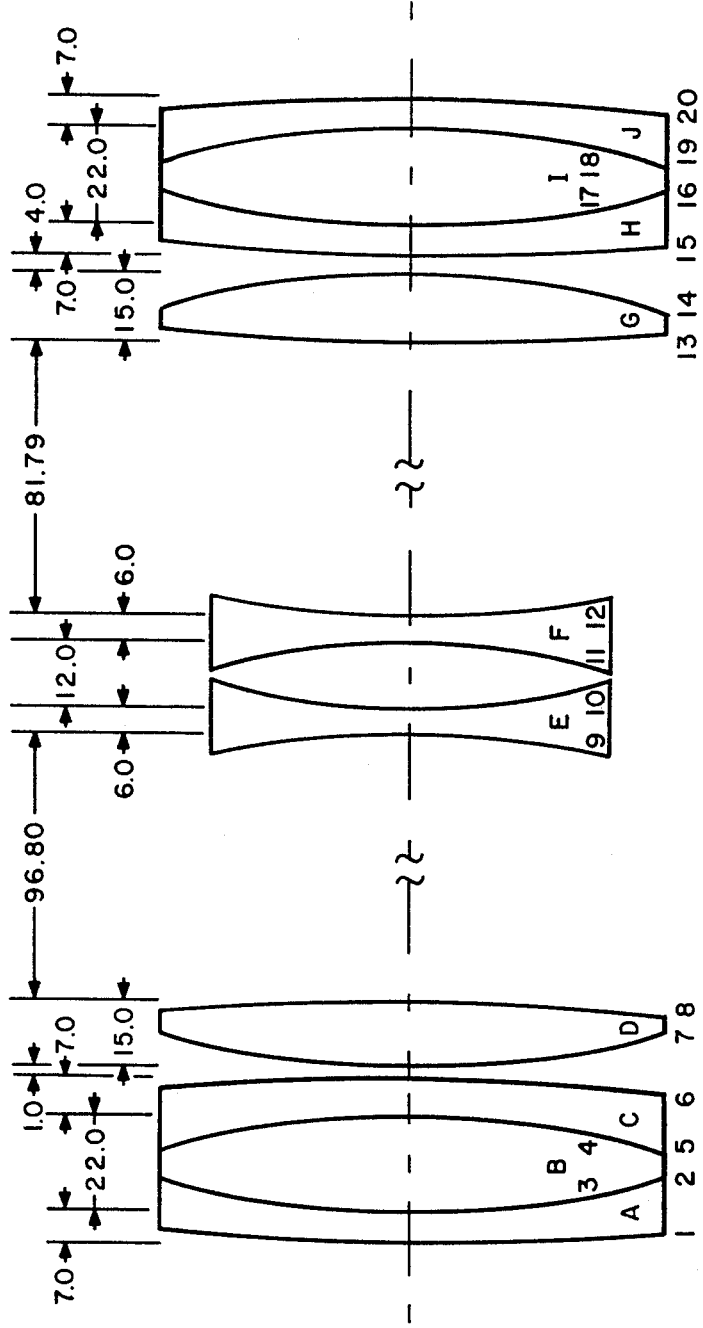
FIG. 2 shows another exemplary lens in accordance with the invention.

Reference is now made to FIG. 2 which shows a second exemplary lens, its prescription being given in Table II hereinbelow.

TABLE II

| Surface | Radius + For Convex Radius − For Concave | Axial Thickness | Optical Glass | Lens Element |
|---|---|---|---|---|
| 1 | +425.0 | 7.0 | 518590 | A |
| 2 | −146.2 | | Melt 353175 | |
| 3 | +146.2 | 22.0 | Calcium Fluoride | B |
| 4 | +205.8 | | | |
| 5 | −205.8 | 7.0 | 518590 | C |
| 6 | +2940.6 | | Melt 353175 | |
| 7 | +172.7 | 15.0 | 518590 | D |
| 8 | +1649.1 | | Melt 353175 | |
| 9 | −410.7 | 6.0 | 518590 | E |
| 10 | −164.5 | | Melt 353175 | |
| 11 | −263.0 | 6.0 | 518590 | F |
| 12 | −218.8 | | Melt 353175 | |
| 13 | +543.8 | 15.0 | 518590 | G |
| 14 | +218.8 | | Melt 353175 | |
| 15 | +380.9 | 7.0 | 518590 | H |
| 16 | −178.7 | | Melt 353175 | |
| 17 | +178.7 | 22.0 | Calcium Fluoride | I |
| 18 | +186.2 | | | |
| 19 | −186.2 | 7.0 | 518590 | J |
| 20 | +742.4 | | Melt 353175 | |

The FIG. 2 lens is a 600 mm, F/6.0, C, e, F range relay objective for a periscope. This lens also gives diffraction limited performance and therefore has excellent general optical performance.

It is very significant that only a very small amount of secondary spectrum is produced by the lenses, which is the result sought. As is well known to those skilled in the art, a normal amount of secondary spectrum present in most lenses in the C-F range, i.e., the visual spectrum, is about 1 part in 2500. In practicing the invention the results are at least about 1 part in 50,000 for glasses in the preferred ranges. However, and more importantly, the longitudinal range of smallest image positions, directly related to classical spherochromatism, is 1 part in 230,000, a value at or beyond the capability of contemporary fabrication procedure. It can therefore be seen that this aspect of optical performance is far superior to that of the prior art.

The foregoing description of preferred embodiments of the invention has been presented for purposes of illustration and description. It is not intended to be exhaustive or to limit the invention to the precise form disclosed, and obviously many modifications and variations are possible in light of the above teaching. They were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A compound lens comprising:
   at least one optical element comprising calcium fluoride;
   at least two optical elements comprising ordinary crown glass having an index of refraction with sodium light between about 1.500 and about 1.540 and an Abbe number of between about 56.5 and about 61.0; and
   wherein the secondary spectrum is less than about 1 part in 50,000 in the C-F range.

2. The invention of claim 1 wherein said ordinary crown glass has an index of refraction between about 1.515 and about 1.525.

3. The invention of claim 1 wherein said ordinary crown glass has an Abbe number of between about 58.5 and about 60.5.

4. The invention of claim 1 wherein said ordinary crown glass has an index of refraction between about 1.515 and about 1.525 and an Abbe number between about 58.5 and about 60.5.

5. The invention of claim 1 wherein said ordinary crown glass is selected from the group consisting of 518590, 522595 and 518603.

6. The invention of claim 1 wherein said optical elements are positioned to provide for said lens a field of view of less than about 12°.

7. The invention of claim 1 wherein said optical elements are positioned to provide for said lens a field of view of less than about 10°.

8. The invention of claim 1 wherein said optical elements are positioned to provide for said lens a field of view of less than about 7°.

9. The invention of claim 1 wherein said optical elements are positioned to provide an F/number for said lens between about F/5 and F/64.

* * * * *